(12) United States Patent
Yeoum et al.

(10) Patent No.: US 9,479,972 B2
(45) Date of Patent: *Oct. 25, 2016

(54) METHOD AND APPARATUS FOR PROVIDING VOICE CALL IN MOBILE COMMUNICATION SYSTEM AND SYSTEM THEREOF

(71) Applicant: Samsung Electronics Co., Ltd., Gyeonggi-do (KR)

(72) Inventors: Tae-Sun Yeoum, Seoul (KR); Beom-Sik Bae, Gyeonggi-do (KR); Sung-Ho Choi, Gyeonggi-do (KR); Hyoung-Kyu Lim, Seoul (KR); Han-Na Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/864,294

(22) Filed: Sep. 24, 2015

(65) Prior Publication Data

US 2016/0014645 A1 Jan. 14, 2016

Related U.S. Application Data

(63) Continuation of application No. 14/327,113, filed on Jul. 9, 2014, now Pat. No. 9,161,389, which is a continuation of application No. 12/465,364, filed on May 13, 2009, now Pat. No. 8,792,417.

(30) Foreign Application Priority Data

May 13, 2008 (KR) .................. 10-2008-0044208

(51) Int. Cl.
*H04W 80/06* (2009.01)
*H04W 36/00* (2009.01)
*H04W 92/02* (2009.01)

(52) U.S. Cl.
CPC ......... *H04W 36/0022* (2013.01); *H04W 92/02* (2013.01)

(58) Field of Classification Search
None
See application file for complete search history.

(56) References Cited

U.S. PATENT DOCUMENTS

| 4,569,041 A | 2/1986 | Takeuchi et al. |
| 5,598,411 A | 1/1997 | Matsukawa |

(Continued)

FOREIGN PATENT DOCUMENTS

| JP | 2007-150424 | 6/2007 |
| KR | 1020040069103 | 8/2004 |

(Continued)

OTHER PUBLICATIONS

U.S. Office Action dated Dec. 9, 2015 issued in counterpart U.S. Appl. No. 14/864,279, 11 pages.

(Continued)

*Primary Examiner* — Hassan Phillips
*Assistant Examiner* — Gautam Sharma
(74) *Attorney, Agent, or Firm* — The Farrell Law Firm, P.C.

(57) ABSTRACT

A method, performed by a mobile management entity (MME), for providing a voice call service to a user equipment (UE) in a mobile communication system and the MME are provided. The method includes receiving, from a mobile management entity (MME), a first message for paging to provide the voice call service to the UE; and sending, to the MME, a second message including a cause associated with a domain change from a packet switching (PS) domain to a circuit switching (CS) domain, wherein, if the MME receives the second message, a third message for requesting suspension of a bearer to provide a service for the UE is sent to a gateway in the PS domain.

6 Claims, 10 Drawing Sheets

(56) References Cited

U.S. PATENT DOCUMENTS

| | | |
|---|---|---|
| 7,423,993 B2 | 9/2008 | Pasanen et al. |
| 7,489,658 B2 | 2/2009 | Kim et al. |
| 8,599,791 B2 | 12/2013 | Mukherjee et al. |
| 8,885,599 B2 | 11/2014 | Rexhepi et al. |
| 2004/0029587 A1 | 2/2004 | Hulkkonen et al. |
| 2004/0156338 A1* | 8/2004 | Pasanen ............... H04W 76/06 370/331 |
| 2004/0185879 A1 | 9/2004 | Kong et al. |
| 2004/0203778 A1 | 10/2004 | Kuo et al. |
| 2007/0014259 A1 | 1/2007 | Fajardo et al. |
| 2007/0211693 A1* | 9/2007 | Hirsimaki ............... H04L 47/14 370/352 |
| 2008/0267128 A1 | 10/2008 | Bennett et al. |
| 2009/0080382 A1 | 3/2009 | Chen et al. |
| 2009/0238143 A1* | 9/2009 | Mukherjee ........ H04W 36/0022 370/331 |
| 2009/0268722 A1 | 10/2009 | Gallagher et al. |
| 2010/0056147 A1 | 3/2010 | Sun et al. |
| 2010/0098023 A1 | 4/2010 | Aghili et al. |
| 2010/0142488 A1 | 6/2010 | Zhang et al. |
| 2010/0303041 A1 | 12/2010 | Diachina et al. |
| 2011/0110326 A1* | 5/2011 | Rexhepi ............ H04W 36/0022 370/331 |

FOREIGN PATENT DOCUMENTS

| | | |
|---|---|---|
| KR | 100815863 | 3/2008 |
| RU | 2237381 | 9/2004 |

OTHER PUBLICATIONS

3rd Generation Partnership Project; Technical Specification Group Services and System Aspects; 3GPP System Architecture Evolution: Report on Technical.

Options and Conclusions (Release 7), 3GPP TR 23.882 V1.15.0, Feb. 2008.

Samsung: "Suspending EPS Bearers", 3GPP Draft, S2-083482__CSFB Suspend_R3, 3rd Generation Partnership Project (3GPP), May 2, 2008.

Samsung: "Suspending EPS Bearers", 3GPP Draft, S2-084145,__CSFB Suspend_R4, 3rd Generation Partenership Project (3GPP), May 16, 2008.

Technical Specification Group Services and System Aspects; Circuit Switched Fallback in Evolved Packet System; Stage 2 (Release 8), 3GPP TS 23.272 V1.1.0.

3rd Generation Partnership Project, Apr. 18, 2008.

Huawei: "Resources Handling during Handover from E-UTRAN to CDMA 1x", 3GPP Draft; S2-083386, 3rd Generation Partnership Project (3GPP), May 2, 2008.

* cited by examiner

METHOD AND APPARATUS FOR PROVIDING VOICE CALL IN MOBILE COMMUNICATION SYSTEM AND SYSTEM THEREOF

PRIORITY

This application is a Continuation Application of U.S. patent application Ser. No. 14/327,113, filed on Jul. 9, 2014, which is a Continuation Application of U.S. patent application Ser. No. 12/465,364, filed on May 13, 2009 and issued as U.S. Pat. No. 8,792,417 on Jul. 29, 2014, which claims priority under 35 U.S.C. §119(a) to a Korean Patent Application filed in the Korean Intellectual Property Office on May 13, 2008 and assigned Serial No. 10-2008-0044208, the entire disclosure of which is incorporated herein by reference.

BACKGROUND OF THE INVENTION

1. Field of the Invention

The present invention relates generally to a mobile communication system, and more particularly, to a method and apparatus for providing voice calls in a heterogeneous mobile communication system and a system thereof.

2. Description of the Related Art

A mobile communication system has been developed that allows users to communicate without geographic restriction. Such a mobile communication system has evolved from an early system that provides only the simple voice communication services into an advanced system that can provide high-speed data services, and packet-based voice services such as Voice Over Internet Protocol (VoIP).

In addition, the mobile communication system has developed from a Circuit Switching (CS) system that provides basic voice services and lower-speed data services, to a Packet Switching (PS) system that offers high-speed packet data services. The CS-based mobile communication system may include a $2^{nd}$ Generation (2G) system and a $3^{rd}$ Generation (3G) system. The 3G system may provide higher-speed data services. Because many users desire to receive much higher-speed data services, there is an increasing need for systems that have progressed from the 2G and 3G systems. To meet the need, a Long Term Evolution/System Architecture Evolution (LTE/SAE) system is currently under development.

SUMMARY OF THE INVENTION

The present invention has been made to address at least the above problems and/or disadvantages and to provide at least the advantages described below. Accordingly, an aspect of the present invention provides a method and apparatus for supporting CS-domain services using other mobile communication systems in a PS-domain mobile communication system that provides IP services, and a system thereof.

Another aspect of the present invention provides a method and apparatus for maintaining a registered state of a User Equipment (UE) in a PS domain while the UE is receiving a voice service, or a voice call service, in a CS domain, and a system thereof.

A further aspect of the present invention provides a method and apparatus for suspending a packet data service being provided over a PS domain when a UE has switched from the PS domain to a CS domain to receive a voice call service, and a system thereof.

According to an aspect of the present invention, a method, performed by an evolved node B (eNB), for providing a voice call service to a user equipment (UE) in a mobile communication system is provided. The method includes receiving, from a mobile management entity (MME), a first message for paging to provide the voice call service to the UE; and sending, to the MME, a second message including a cause associated with a domain change from a packet switching (PS) domain to a circuit switching (CS) domain, wherein, if the MME receives the second message, a third message for requesting suspension of a bearer to provide a service for the UE is sent to a gateway in the PS domain.

According to another aspect of the present invention, an evolved node B (eNB) for providing a voice call service to a user equipment (UE) in a mobile communication system is provided. The eNB includes a transceiver for transmitting and receiving messages; a controller configured to control the transceiver to receive, from a mobile management entity (MME), a first message for paging to provide the voice call service to the UE, and control the transceiver to transmit, to the MME, a second message including a cause associated with a domain change from a packet switching (PS) domain to a circuit switching (CS) domain, wherein, if the MME receives the second message, a third message for requesting suspension of a bearer to provide a service for the UE is sent to a gateway in the PS domain.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Figure 1:
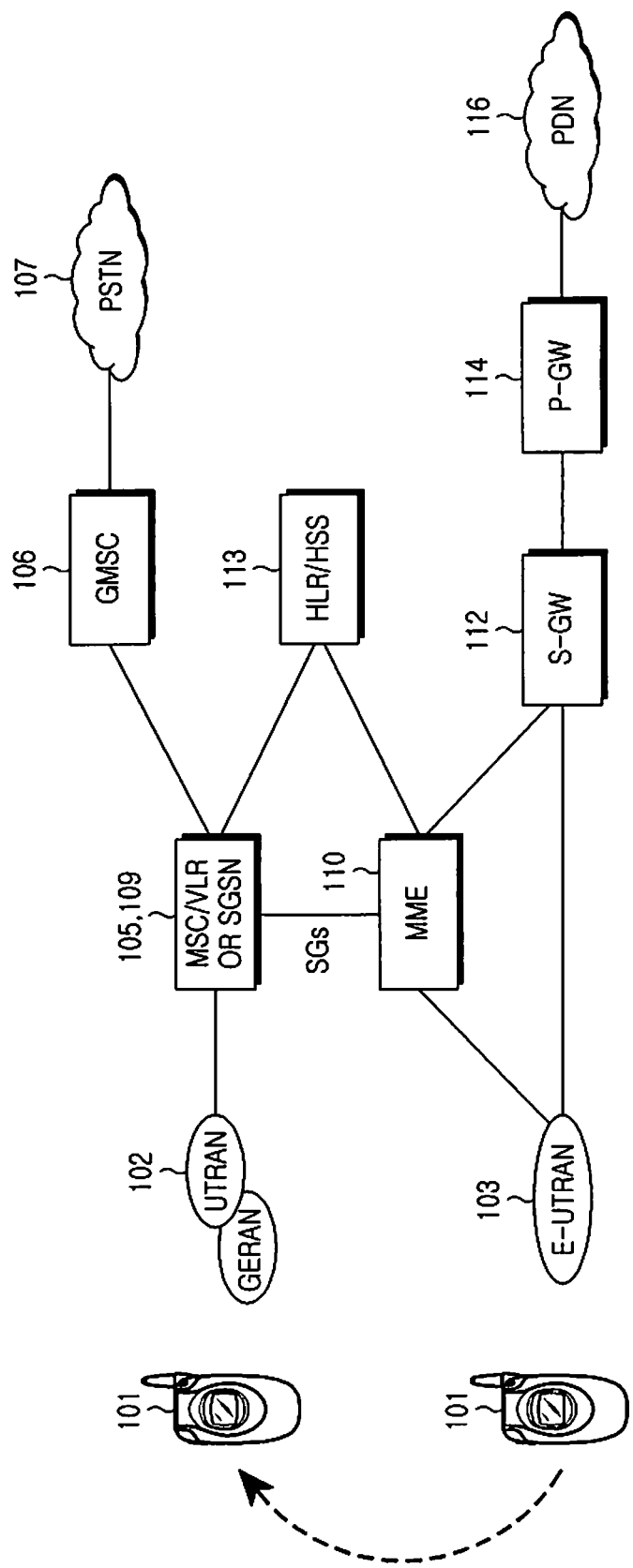
FIG. 1 is a diagram illustrating a configuration of a mobile communication system with a CS domain and a PS domain, to which an embodiment of the present invention is applied.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but, are merely used by the inventor to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the embodiments of present invention provide a method, apparatus and a system for providing a mobile network service, which was being provided from a heterogeneous mobile communication system over a CS domain and a PS domain, to a UE in an evolved mobile communication system that provides only the PS domain.

An evolved mobile communication network, according to embodiments of the present invention, sends a request message requesting location registration for a UE to a legacy or previous mobile communication network that provides a CS domain, thereby notifying the legacy mobile communication network of the current location of the UE in the evolved mobile communication network.

As used herein, the term "evolved mobile communication network" refers to a mobile communication network providing packet data services over a PS domain, like Long Term Evolution (LTE). The term "legacy mobile communication network" means a 2G or 3G mobile communication network providing the legacy CS domain, like Wideband Code Division Multiple Access (W-CDMA), Code Division Multiple Access (CDMA) network, or Global System for Mobile Communication (GSM).

When a voice call is received at a legacy mobile communication network, the legacy mobile communication network notifies a registered evolved mobile communication network of the receipt of the voice call so that a UE may switch to the legacy mobile communication network and receive the voice call over the legacy mobile communication network. When a UE sends a voice call over the legacy mobile communication network, the UE receives information about the legacy mobile communication network from the evolved mobile communication network. Based on the received information, the UE switches to the legacy mobile communication network and sends the voice call over the legacy mobile communication network.

As the service being provided in the evolved mobile communication network transitions to an idle state, the evolved mobile communication network maintains the state of the UE even while the UE is receiving the voice call service in the legacy mobile communication network.

FIG. 1 illustrates a configuration of a mobile communication system with a CS domain and a PS domain, to which the present invention is applied.

Referring to FIG. 1, a UE 101 is connected to a phone call service over an IP network. Reference numeral 102 indicates a Core Network (CN) or a Non-Access Stratum, and an Access Network (AN) or an Access Stratum, in a General Packet Radio Service/Universal Mobile Telecommunications System (GPRS/UMTS), which is a European $2.5^{th}$ generation or $3^{rd}$ generation mobile communication system.

An Evolved UMTS Terrestrial Radio Access Network (E-UTRAN) 103, an All-IP based core network, manages radio access. A Mobility Management Entity (MME) 110 takes charge of authentication and registration for the UE 101, when the UE 101 accesses a mobile communication network through the E-UTRAN 103. Further, the MME 110 handles a service request from the UE 101, and guarantees mobility of the UE 101 when the UE 101 travels between Node Bs in the E-UTRAN 103.

A Serving Gateway (S-GW) 112 provides a bearer service for delivering a user's service data packet, including voice packet information, to the E-UTRAN 103.

A Packet Data Network Gateway (P-GW) 114 assigns an IP address to the UE 101 that accessed the mobile communication network, thus providing IP connectivity. A merger of the MME 110, the S-GW 112, and the P-GW 114 is called an Evolved Packet Core Network (EPC).

An enhanced Mobile Switching Center/Visited Location Register (MSC/VLR) 105 represents a mobile switching center of the 2G or 3G mobile communication network. MSC is divided into a Gateway MSC (GMSC) 106 and the MSC/VLR 105. The MSC/VLR 105 is an MSC that actually provides services to the UE 101, and the GMSC 106 serves to deliver a call signal to the MSC/VLR 105 to which the UE 101 is connected. The MSC/VLR 105 is connected to the MME 110 via an SGs interface, for interworking with the EPC. The MSC/VLR 105 sends a UE paging request to the MME 110 via the SGs interface, and receives a location registration request for the UE 101.

A Serving GPRS Support Node (SGSN) 109 is an entity that provides PS-domain services to the UE 101 in a UTRAN (UMTS Terrestrial Radio Access Network)/GERAN (GSM/EDGE Radio Access Network) network 102.

A Home Location Register/Home Subscriber Server (HLR/HSS) 113 stores and provides information about users who subscribed to the service provider running the mobile communication network, and the current location and registered state information of UEs.

When a UE has switched from the LTE/SAE system to a 2G network to receive a voice call, the currently accessed PS-domain service may be suspended in the LTE/SAE system if the UE cannot continue to enjoy the PS-domain service in the 2G network, which was provided in the LTE/SAE system. If data heading to the UE is received at the LTE/SAE system, the LTE/SAE system may deregister the connection, determining that the UE is out of the service area.

Figure 2:
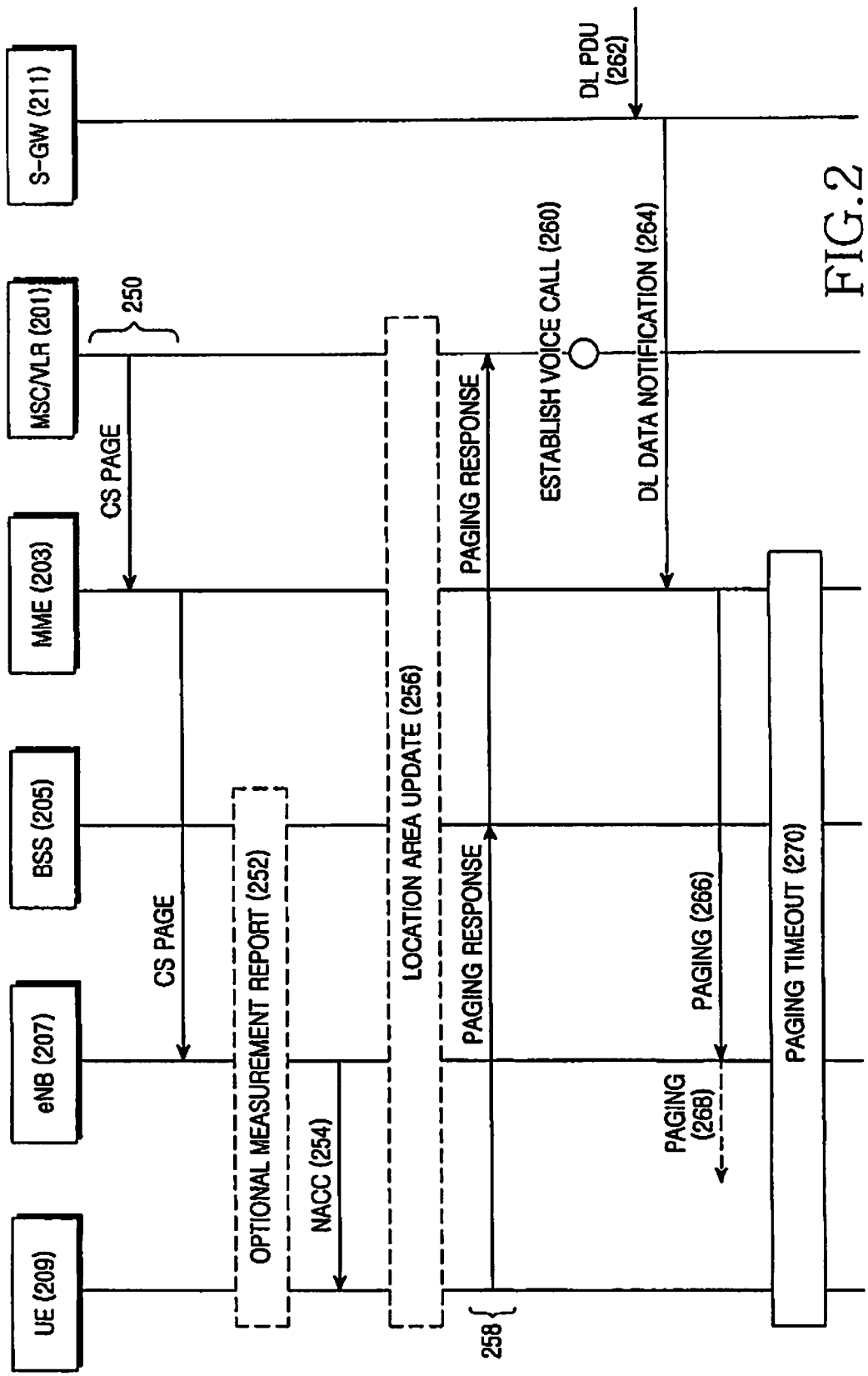
FIG. 2 is a flow diagram illustrating a CS-domain service method in the mobile communication network of FIG. 1.

FIG. 2 is a flow diagram illustrating a CS-domain service method in the mobile communication network of FIG. 1.

Referring to FIG. 2, in step 250, an MSC/VLR 201, which has received a voice call over a CS domain, sends a CS Paging Request message to an MME 203 that is servicing a UE 209, determining that the UE 209 is currently connected to an undepicted EPC via an eNB 207 in an E-UTRAN 103. When the UE 209 is located in a cell supporting the CS domain, the MSC/VLR 201 directly pages the UE 209, and when the UE 209 is located in an E-UTRAN network, the MSC/VLR 201 sends a paging request for the UE 209 to the MME 203. The CS Paging Request message includes a CN Domain Indicator requesting a connection to the CS domain. Upon receipt of the CS Paging Request message, the eNB 207 in the E-UTRAN 103 sends, if needed, a request for neighbor cell information to the UE 209 and determines a target cell to which it will switch the UE 209, according to information responded by the UE 209 or the information previously set in the network, in step 252.

When an E-UTRAN in the target cell, to which the UE 209 will switch, cannot support the PS services, which the UE 209 was receiving, together with the CS services, the eNB 207 provides, in step 254, target cell information to the UE 209 using Network Assisted Cell Change (NACC), Redirection, or the like, while maintaining the PS session currently being provided in an Evolved Packet System (EPS). This allows the UE 209 to switch to the target cell. The EPS includes the EPC, the eNB and the UE. NACC is a technique for providing cell information of a GERAN network to the UE for the UE's rapid switching when the UE switches from the UTRAN network to the GERAN network. A technique for switching from an E-UTRAN network to a GERAN network has also recently been defined. Redirection is also a method having similar purposes, and is different from NACC in terms of Radio Resource Control (RRC) signaling.

When the UE 209 switches to the target cell, the UE 209 sends, if needed, a Location Area Update (LAU) request message to the MSC/VLR 201 to provide information about its current location in step 256. The UE 209 sends a Paging Response message to the MSC/VLR 201 over a UTRAN/GERAN network 102 in step 258. In step 260, the MSC/VLR 201 establishes a voice call according to a voice call connection procedure and provides a voice call service to the UE 209 in the legacy CS domain.

The CS-domain service method in the mobile communication network has the following problems.

If a Downlink Packet Data Unit (DL PDU) is received over a PS domain in step 262 while the UE 209 is using a voice service in step 260, an S-GW 211, which does not know the fact that the UE 209 is currently receiving the voice service, sends a DL Data Notification message indicating receipt of the DL PDU to the MME 203 according to a normal DL PDU reception procedure in step 264. The MME 203 sends a Paging Request message to the eNB 207 in the E-UTRAN 103 in step 266. However, because the UE 209 is currently receiving the voice service in coverage of the UTRAN/GERAN network 102, the UE 209 cannot receive a Paging Request message from the eNB 207 in the E-UTRAN 103 in step 268. In step 270, if the MME 203 determines failure of paging because it has failed to receive a response to the Paging request, the MME 203 performs a procedure for releasing the registered state of the UE 209 in the PS domain. Therefore, when the UE 209 accesses the E-UTRAN 103 after completing the voice service, the UE 209 should newly perform the PS-domain registration procedure from the beginning, and may lose all information about the existing PS session.

Embodiments of the present invention, described below, may be applied when the same PS service as the PS service the UE was receiving in the evolved mobile communication network, such as the LET network, cannot be continuously provided in the legacy mobile communication network such as the WCDMA/GSM/CDMA 2000 1× network.

The evolved mobile communication system according to embodiments of the present invention, described below, sends a request message requesting location registration for a UE to the legacy mobile communication system that provides a CS domain, to notify the legacy mobile communication system of the current location of the UE in the evolved mobile communication system.

When an event, such as a voice call, occurs in the legacy mobile communication system, the mobile communication system, according to embodiments of the present invention, notifies the registered evolved mobile communication system of the occurrence of event so that the UE may switch to the legacy mobile communication system and receive a service over the legacy mobile communication system.

When the UE has moved or switched to the legacy mobile communication system without a PS handover procedure by which the UE can receive, even in the legacy mobile communication system, the same PS service as the PS service it was receiving in the evolved mobile communication system, the evolved mobile communication system may maintain the registered state of the UE. In the following description, although the MSC of the mobile communication system providing a phone call service and the evolved core network based on 3GPP will be taken as an example of the LTE/SAE system, the procedure provided by the present invention can be equally applied even to the mobile communication networks that use other protocols or access standards.

In the following description, the expression "a UE is located in a specific domain" includes both a meaning that the UE is located in an area of the specific domain, and another meaning that the UE accesses the specific domain. The phrase "a current location of a UE" also includes both a meaning of "an actual location of the UE" and another meaning of "a specific network that the UE currently accesses." For example, in the specification, the expression "a UE is located in a CS domain" includes both an expression that the UE is located in an area of the CS domain, and another expression that the UE accesses the CS domain. In addition, an expression "a UE moves to a specific domain" includes a meaning that the UE switches to a specific domain.

Figure 3:
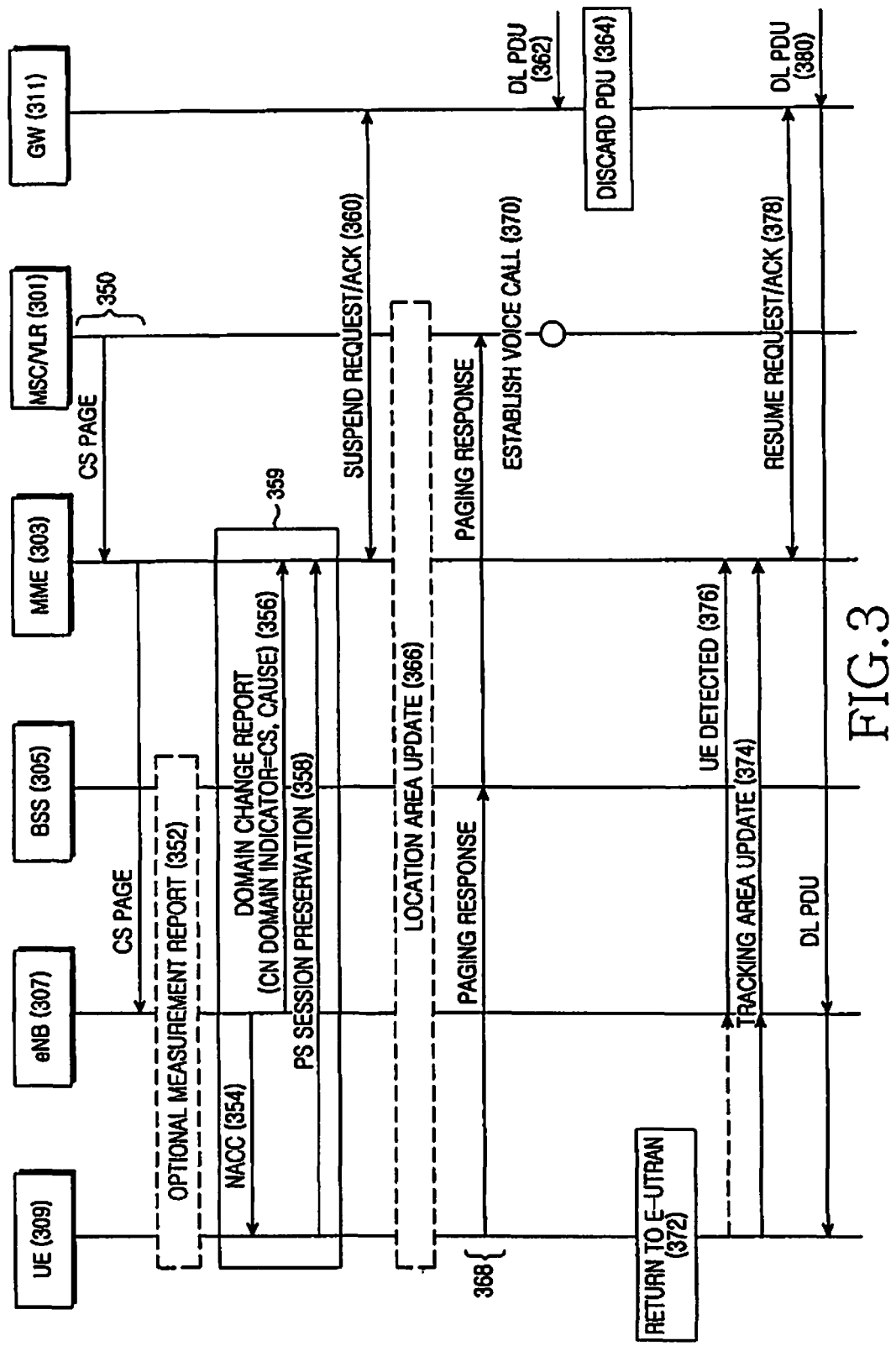
FIG. 3 is a flow diagram illustrating a CS-domain service method in a mobile communication network, according to an embodiment of the present invention.

FIG. 3 is a flow diagram illustrating a CS-domain service method in a mobile communication network, according to an embodiment of the present invention.

Referring to FIG. 3, in step 350, an MSC/VLR 301, which has received a voice call over a CS domain, sends a CS Paging Request message to an MME 303 that is servicing a UE 309, determining that the UE 309 is currently connected to an LTE/SAE system via an eNB 307 in the E-UTRAN 103. The MSC/VLR 301 can determine if the UE 309 is connected to the LTE/SAE system when the UE 309 performs registration in the MSC/VLR 301 over the LET network. The CS Paging Request message includes a CN Domain Indicator requesting a connection to the CS domain.

Upon receipt of the CS Paging Request message, the eNB 307 in the E-UTRAN 103 sends, if needed, a request for neighbor cell information to the UE 309 and determines a target cell to which it will switch the UE 309, according to information responded by the UE 309 or the information previously set in the network, in step 352.

When the target cell to which the UE 309 will switch cannot support PS services together with the CS services, the eNB 307 provides, in step 354, the target cell information, which is equal to information about the channel the UE 309 will use in the target cell, to the UE 309 using NACC while maintaining the PS session currently being provided in the LTE/SAE network. This allows the UE 309 to switch to the target cell and receive a service. Step 354 is possible even with the Redirection method as described above. In step 356, the eNB 307 in the E-UTRAN 103 sends to the MME 303 a Domain Change Report message indicating that the UE 309 has switched to an area where it cannot provide PS services (i.e. that the UE 309 is out of the EPS network). The Domain Change Report message includes an indicator indicating that the UE 309 is currently located in the CS domain.

In addition, the Domain Change Report message includes a Cause indicating that the Domain Change Report message is sent because the UE 309 cannot receive PS services. In the present invention, the indicator indicating that the UE 309 is currently located in the CS domain is a CN Domain Indicator. The CN Domain Indicator is set to indicate "CS" and transmitted through the Domain Change Report message. Also, the UE 309 may directly send a PS Session Preservation message to the MME 303 to request suspension of the PS session in step 358.

The embodiment of the present invention proposes, as shown in step 359, two different methods in which the MME 303 can determine that the UE 309 has switched to the CS domain. The eNB 307 may determine whether the UE 309 is located in the CS domain and provide the resulting information to the MME 303 using the Domain Change Report message as in step 356, or the UE 309 may directly provide its location information to the MME 303 using the PS Session Preservation message as in step 358. In this specification, the Domain Change Report and the PS Session Preservation message, which are sent to the MME 303 in step 359, are referred to as "report messages."

Through the process in step 359, the MME 303 may determine that the UE 309 cannot receive packet services over the PS domain because the UE 309 is currently receiving a voice call service in the CS domain.

A similar process may apply to another case where the UE 309 sends a voice call, in addition to the foregoing case where the UE 309 receives a voice call. When the UE 309 sending a voice call sends a request for an outgoing voice call to the LTE/SAE network, the UE 309 receives information used to switch to the target cell via the E-UTRAN 103 as in step 352.

The MME 303, which received the message in step 356 or 358, indicates that the UE 309 is registered in the PS domain of the EPC network. The UE 309 is in an idle state where a radio connection is not maintained, and cannot receive a response to a Paging request for data reception, i.e. the EPS service is suspended. That is, in step 359, the MME 303 knows that it cannot receive a Paging Response message from the UE 309, using the indicator in the message received from the UE 309 or the eNB 307. Accordingly, the EPS sends no Paging message to the UE 309. Further, in order to avoid unnecessarily paging the UE 309 due to additional data reception, the MME 303 sends a Service Change Request message for preventing data reception to a GW 311 such as an S-GW and a P-GW, or sends a Suspend Request message for requesting the GW 311 to set a service state of the UE 309 as a suspended state, in step 360. Thereafter, a DL PDU received in step 362 is discarded in the GW 311 such as S-GW or P-GW in step 364, and the S-GW 112 does not send a DL Data Notification message requesting UE paging, to the MME 303.

Concerning step 360, the same function may be achieved using an Update Bearer Request message instead of the Suspend Request message. If the maximum transmission/reception rate for a bearer is set to 0 Kbps using the Update Bearer Request message, data transmission/reception can be prevented in the P-GW 114. The Update Bearer Request message may include a Cause indicating that the Update Bearer Request is sent because the UE 309 cannot receive PS services. When the Cause is included, the GW 311 may internally set the UE's state.

If the UE 309, which received the target cell information in step 354, switches to the target cell, the UE 309 sends, if needed, a Location Area Update request message to the MSC/VLR 301 to notify the current location (UE is currently located in the CS domain) of the UE 309 in step 366, and sends a Paging Response message to the MSC/VLR 301 over the UTRAN/GERAN network 102 in step 368. Step 368 can be omitted for an outgoing call. In step 370, the MSC/VLR 301 establishes a voice call according to a voice call connection procedure in the legacy CS domain, and provides a voice call service to the UE 309. Even though there is a DL PDU received over the PS domain in step 362 while the GW 311 is providing a voice call service, no paging request occurs in the PS domain because the DL PDU is discarded in step 364.

When the UE 309, which has terminated the voice call service, returns to the E-UTRAN network in step 372, the UE 309 sends a Non-Access Stratum (NAS) message such as a Tracking Area Update message to the MME 303 over the EPC network in step 374. Then the MME 303 determines that PS services are available. Also, when the eNB 307 in the E-UTRAN 103 has received any message from the UE 309, the eNB 307 may inform the MME 303 of the receipt in step 376. The MME 303, which received the NAS message such as a Tracking Area Update message in step 374 or received the message associated with the UE 309 from the eNB 307 in the E-UTRAN 103 in step 376, releases a suspended state, if any, where the current state of the UE 309 is registered in the PS domain but a Paging message cannot be received. The MME 303 sends a Data Reception Resume Request message to the GW 311, such as an S-GW and a P-GW, in step 378 so that a DL PDU can be provided to the UE 309 in step 380 after step 378. The MME 303 sends a Resume Request message as an example of the Data Reception Resume Request message to release the suspended state of the UE 309 in the GW 311, or sends a Bearer Update Request message to reset the maximum transmission/reception rate for the bearer belonging to the UE 309 to a previous value for the service suspended state.

Figure 4:
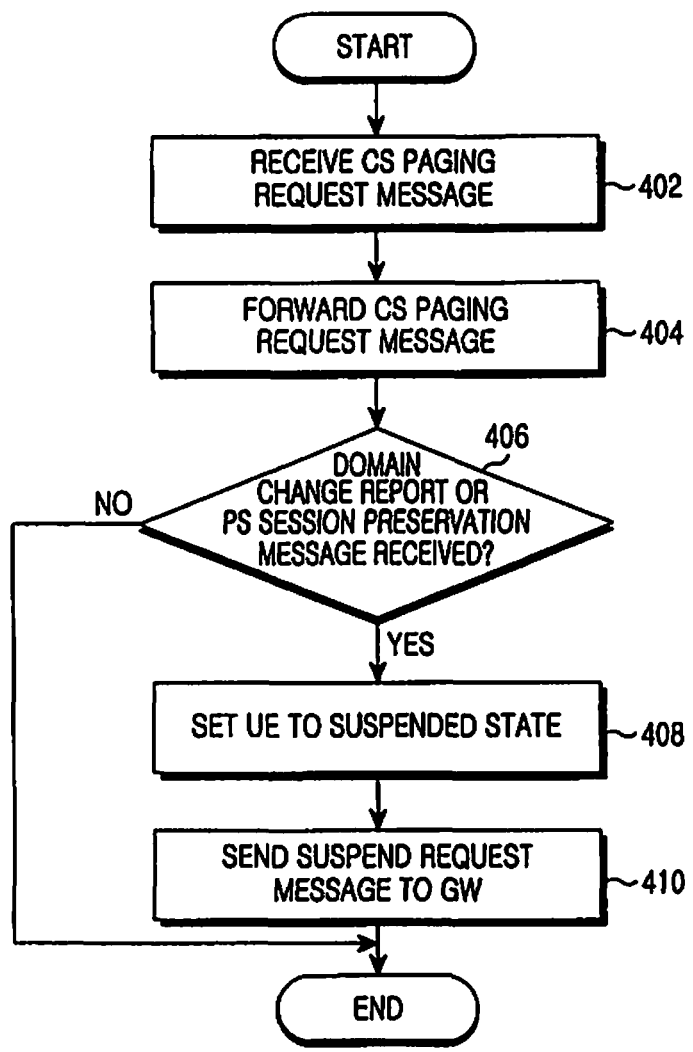
FIG. 4 is a flowchart illustrating an operation of an MME, according to an embodiment of the present invention.

FIG. 4 is a flowchart illustrating an operation of an MME 303, according to an embodiment of the present invention. In step 402, the MME 303 receives a CS Paging Request message from an MSC/VLR 301. In step 404, the MME 303 forwards the CS Paging Request message to an eNB 307 in an E-UTRAN. Thereafter, if the MME 303 receives a Domain Change Report message indicating that the UE 309 has switched to a target cell not supporting PS services, from the eNB 307 in the E-UTRAN, or receives a PS Session Preservation message from the UE 309 in step 406, the MME 303 sets the UE 309 to a suspended state in step 408. In order to avoid unnecessarily sending a Paging message to the UE 309 due to receipt of a DL PDU, the MME 303 additionally sends a Suspend Request message to a GW 311 in step 410, setting a state in which the UE 309 cannot receive data. Alternatively, as described in FIG. 3, the set maximum transmission/reception rate of an Update Bearer Request message may be changed to perform the same function as the Suspend Request message.

Figure 5:
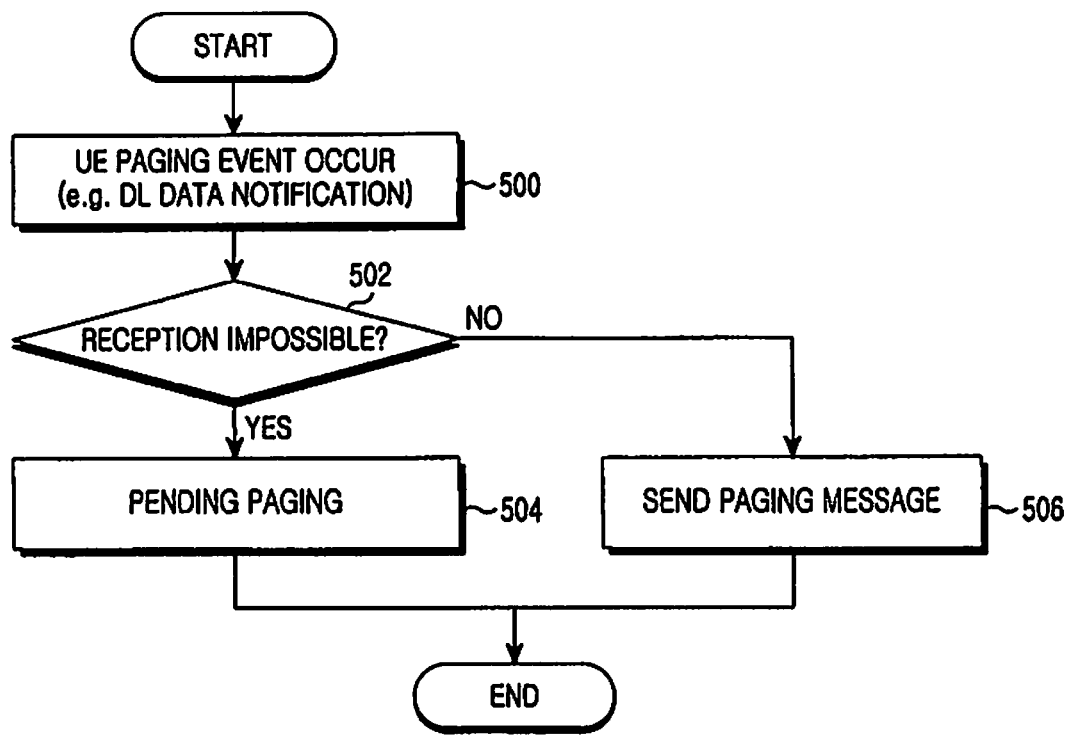
FIG. 5 is a flowchart illustrating an operation of an MME when it should send a Paging message to a UE, according to an embodiment of the present invention.

FIG. 5 is a flowchart illustrating an operation of an MME 303 when it should send a Paging message to a UE 309, according to an embodiment of the present invention.

If a situation occurs in step 500, in which the MME 303 should send a Paging message to the UE 309, the MME 303 determines in step 502 whether the UE 309 is now in a state where it cannot receive a Paging message. If it is determined in step 502 that the UE 309 is in the state where it cannot receive a Paging message, the MME 303 stores the information indicating existence of a pending Paging message to the UE 309 without sending any Paging message, in step 504. On the contrary, if it is determined in step 502 that the UE 309 is in the state where a Paging message can be received, the MME 303 pages the UE 309 by sending a Paging message to an eNB 307 in an E-UTRAN in step 506.

Figure 6:
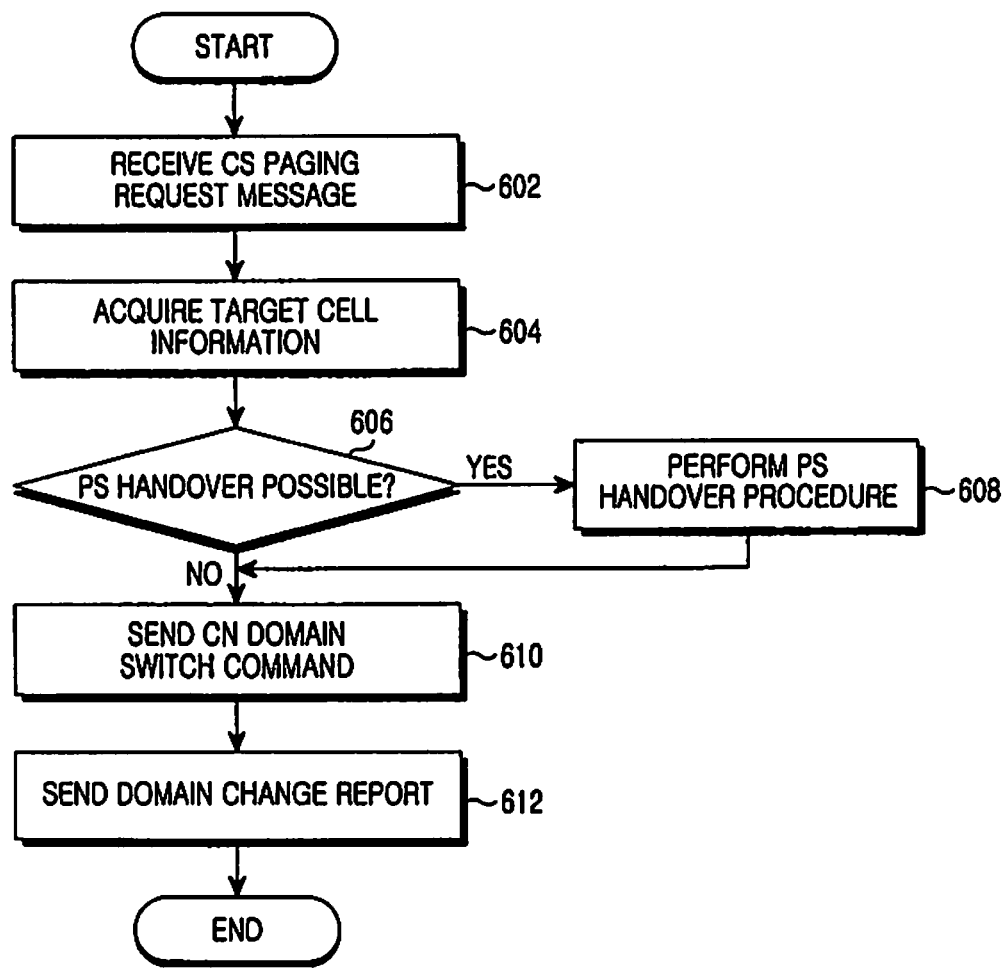
FIG. 6 is a flowchart illustrating an operation of an eNB when it should send a CS Paging message to a UE, according to an embodiment of the present invention

FIG. 6 is a flowchart illustrating an operation of an eNB 307 when it should send a CS Paging message to a UE 309, according to an embodiment of the present invention.

In step 602, the eNB 307 receives a CS Paging Request message from an MME 303 or the UE 309 (in case of an outgoing call). Herein, the CS Paging Request message commonly refers to a Paging Request message received from a CDMA2000 network. In step 604, the eNB 307 gathers information about a target cell to which the UE 309 will switch, from a target network. In step 606, the eNB 307 determines a PS handover depending on whether the target cell supports a PS handover. If the PS handover is possible, the eNB 307 sends, in step 608, a request for a PS handover procedure to the MME 303 regarding the PS service that the UE 309 is receiving. In step 610, the eNB 307 commands the UE 309 to switch to a CS domain of the target cell. Examples of such a command may include handover command, NACC, Redirection, etc. In the present invention, any other messages can be used as messages commanding the switching to the CS domain. In step 612, the eNB 307 sends the MME 303 a Domain Change Report message indicating that the UE 309 has switched to the CS domain.

Figure 7:
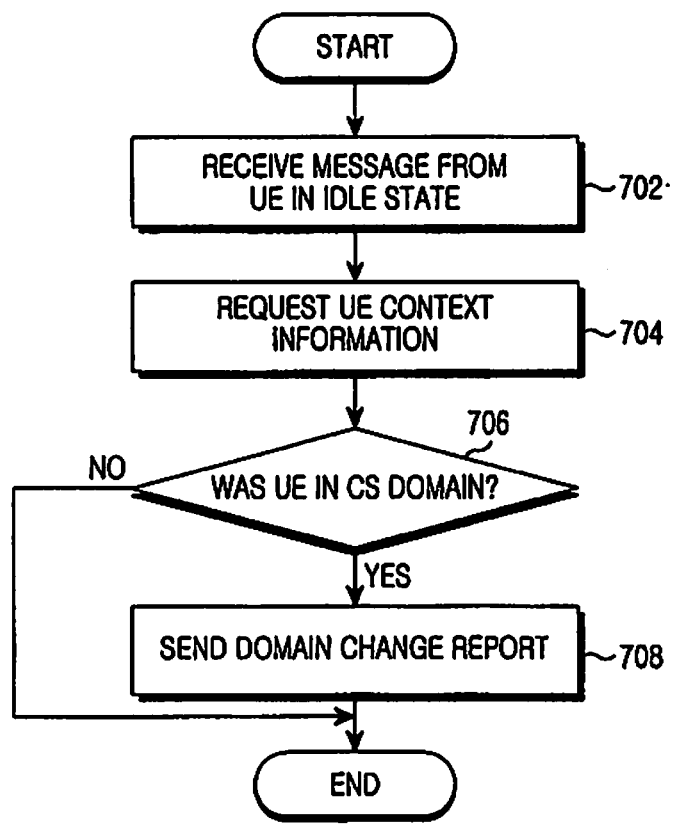
FIG. 7 is a flowchart illustrating an operation of an eNB when it received a first message from a UE in an idle state, according to an embodiment of the present invention.

FIG. 7 is a flowchart illustrating an operation of an eNB 307 when it received a first message from a UE 309 in an idle state, according to an embodiment of the present invention.

In step 702, the eNB 307 receives a message from the UE 309 in an idle state, which was not connected to the eNB 307. In step 704, the eNB 307 requests UE context information for communication with the UE 309, from the MME 303. In step 706, the eNB 307 determines that the UE 309 has now returned from the CS domain to the PS domain, based on the recent domain information of the UE 309, contained in the UE context information. In step 706, the eNB 307 may determine if the UE 309 was located in the CS domain by checking if the CN domain indicator is set as "CS domain." If it is determined in step 706 that the UE 309 has returned from the CS domain to the PS domain, the eNB 307 sends a Domain Change Report message indicating that the UE 309 has returned to the PS domain, to the MME 303 in step 708.

Figure 8:
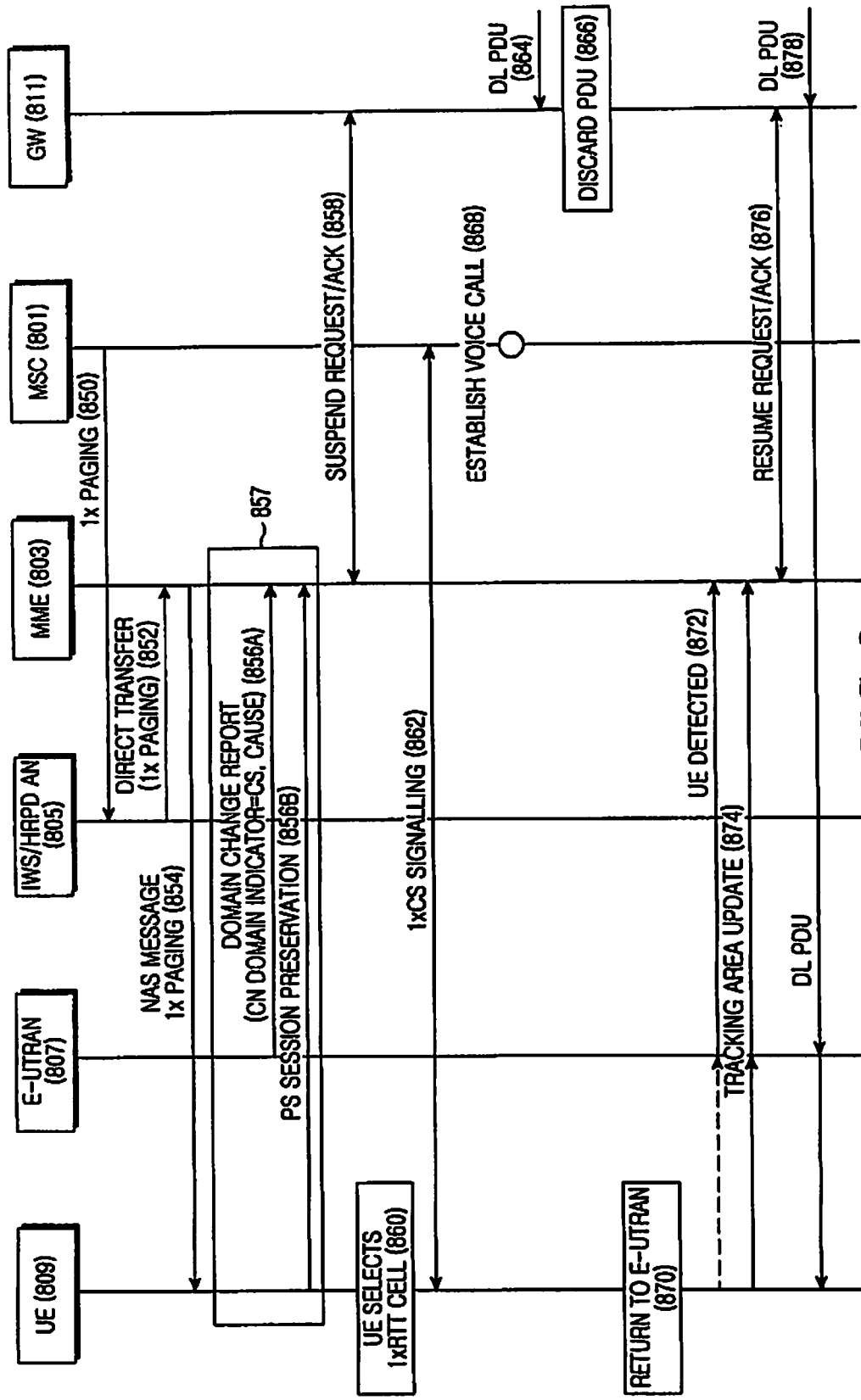
FIG. 8 is a flow diagram illustrating a CS-domain service method when a voice call is received in a 3GPP2 CDMA2000 1×CS network, according to an embodiment of the present invention.

FIG. 8 is a flow diagram illustrating a CS-domain service method when a voice call is received in a 3GPP2 CDMA2000 1× CS network, according to an embodiment of the present invention.

A UE 809 has been registered in a CDMA2000 1× CS network via an E-UTRAN 807, using a tunneling message that passes through an MME 803.

When an MSC 801, which has received an incoming call for the UE 809, sends a 1× Paging message over a 1×CS InterWorking Solution (IWS) or High Rate Packet Data (HRPD) Access Network (AN) 805 in step 850, the 1×CS IWS/HRPD AN 805 directly transfers the 1× Paging message to the MME 803 using a tunneling message in step 852. Upon receiving the tunneling message from the 3GPP2 1×CS network, the MME 803 forwards the received 1× Paging message to the UE 809 using a NAS tunneling message in step 854. When a 3GPP2 message delivered by the NAS message is a 1× Paging message, an indication that the tunneling message is a CS Paging message can be made so that an eNB in the E-UTRAN 807 may have no need to check the NAS message. When there is no such indication, the eNB checks all contents of a NAS message carrying 1× messages to determine if the NAS message is a Paging Request message. In step 854, the MME 803 pages the UE 809 by sending the 1× Paging message. Step 854 is a procedure that should be performed in advance to provide a voice call, or a CS-domain service, to the UE 809.

When the message being delivered is a 1× Paging Request message or when it is determined that the UE 809 has switched to a target cell in a CS domain, the eNB in the E-UTRAN 807 sends a Domain Change Report message to the MME 803 in step 856a, indicating that the UE 809 has switched to the CS domain. Also, the UE 809 may directly send a PS Session Preservation message requesting suspension of a PS session, to the MME 803 in step 856b. Upon receiving the message in step 856a or 856b, the MME 803 indicates that the UE 809 is in a state where it cannot receive packet services. In step 858, the MME 803 sends a Suspend Request message to a GW 811 to change a state of the UE 809 in the GW 811 to a state in which packet transmission/reception is suspended, thereby making it possible for the UE 809 to transmit/receive no more packet data while receiving a CS service in the CS service.

Similarly, there are two methods in FIG. 8, by which the MME 803 can determine that the UE 809 is in the CS domain. The two methods just correspond to steps 856a and 856b. The MME 803 receives the Domain Change Report message from the E-UTRAN 807 in step 856a, or the PS Session Preservation message from the UE 809 in step 856b, thereby determining that the UE 809 cannot receive PS-domain services as it is currently located in the CS domain. Through step 857, the MME 803 may determine that the UE 809 cannot currently receive PS-domain services. In the meantime, in step 860 and 862, the UE 809, which has switched to the CDMA2000 1× CS domain, receives a voice call service through an incoming/outgoing call connection procedure based on the 1× CS signaling procedure with the MSC 801 in the CDMA2000 1× network as in the existing procedure. Steps 864 to 878 are equivalent to step 362, step 364, and steps 370 to 380 of FIG. 3.

Figure 9:
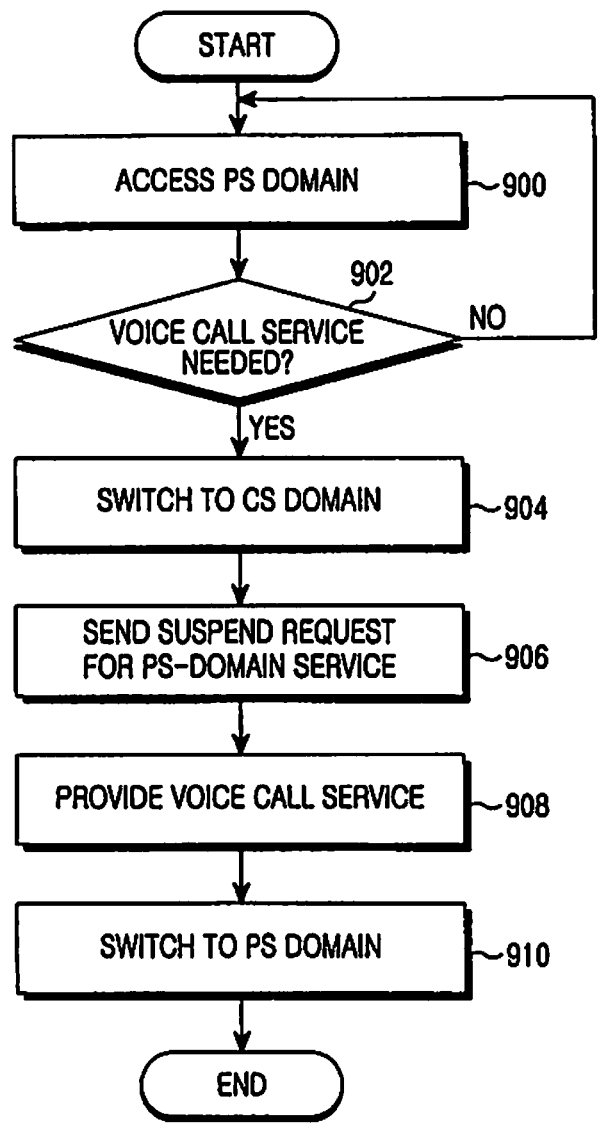
FIG. 9 is a flowchart illustrating an operation of a UE, according to an embodiment of the present invention.

FIG. 9 is a flowchart illustrating an operation of a UE 309 (or 809), according to an embodiment of the present invention.

In step 900, the UE 309 (or 809) accesses a PS domain and receives a service over the PS domain. In step 902, the UE 309 (or 809) determines if a CS-domain service such as a voice call service is needed. For example, upon receiving a message such as a Paging message from a CS domain, the UE 309 (or 809) may determine that a CS-domain service is needed. If it is determined in step 902 that a voice call service is needed, the UE 309 (or 809) switches to the CS domain according to a predetermined handover procedure in step 904. In step 906, the UE 309 (or 809) requests an MME 303 (or 803) to suspend a PS-domain service as in step 358 of FIG. 3 or step 856b of FIG. 8. After requesting the suspension of the PS-domain service in step 906, the UE 309 (or 809) provides a voice call service in step 908, and then switches to the PS domain in step 910 when the voice call service is terminated.

Figure 10:
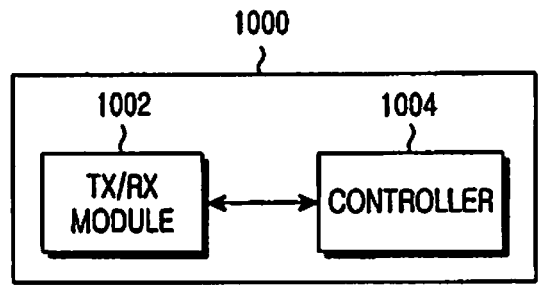
FIG. 10 is a block diagram of an eNB, according to an embodiment of the present invention.

FIG. 10 is a block diagram of an eNB 1000, according to an embodiment of the present invention.

An eNB 1000 in FIG. 10 represents the eNB 307 in FIG. 3, and the eNB of an E-UTRAN 807 in FIG. 8. In the eNB 1000, a transmission/reception module 1002 receives a Paging message from an MME 303 (or 803), provides it to a controller 1004, and delivers the received Paging message to a UE 309 (or 809) under control of the controller 1004. In addition, the transmission/reception module 1002, under control of the controller 1004, sends to the MME 303 (or 803) a Domain Change Report indicating that the UE 309 (or 809) cannot receive PS-domain services as it has switched to the CS domain.

Upon receiving the Paging message through the transmission/reception module 1002, the controller 1004 determines if the UE 309 (or 809) to which it will deliver the Paging message has switched from the PS domain to the CS domain. If the UE 309 (or 809) has switched to the CS domain, the controller 1004 controls the transmission/reception module 1002 to send the Domain Change Report message to the MME 303 (or 803). Further, the controller 1004 gathers information about a target cell for the UE 309 (or 809), determines whether to perform a PS handover depending on whether the target cell supports the PS handover, and sends/receives handover-related messages through the transmission/reception module 1002 according to the determination result.

Figure 11:
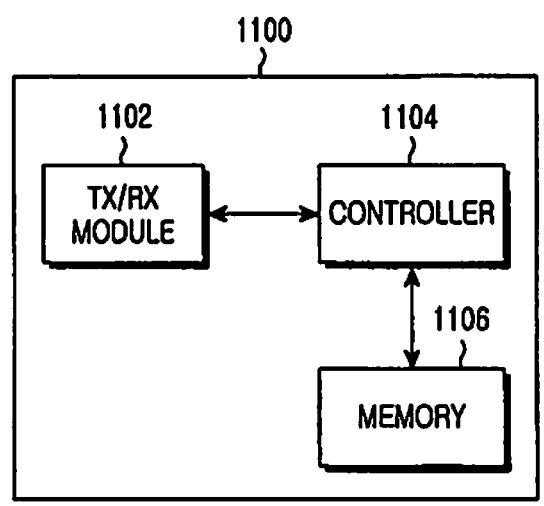
FIG. 11 is a block diagram of an MME, according to an embodiment of the present invention.

FIG. 11 is a block diagram of an MME 1100, according to an embodiment of the present invention. An MME 1100 in FIG. 11 represents the MME 303 in FIG. 3, and the MME 803 in FIG. 8. A transmission/reception module 1102 in the MME 1100 exchanges messages with network entities in each of a CS domain and a PS domain, delivers received messages to a controller 1104, and sends messages created by the controller 1104. When a Paging message is received from an MSC 301 (or 801) in the CS domain, the transmission/reception module 1102 in the MME 1100 delivers the received Paging message to the controller 1104, and the controller 1104 controls the transmission/reception module 1102 to send the Paging message to a UE 309 (or 809). When a message indicating that the UE 309 (or 809) has switched to the CS domain is received from an eNB 307 (or 807) or the UE 309 (or 809) through the transmission/reception module 1102, the controller 1104 sets a PS-domain service for the UE 309 (or 809) to a suspended state and stores the resulting information in a memory 1106. When the MME 1100 receives a Domain Change Report message from the eNB 307 (or 807) or a PS Session Preservation message from the UE 309 (or 809), the controller 1104 sets the PS-domain service for the UE 309 (or 809) to a suspended state and stores the resulting information in the memory 1106.

After setting the PS-domain service to the suspended state regarding the UE 309 (or 809), the controller 1104 controls the transmission/reception module 1102 to send a Suspend Request message to a GW.

Figure 12:
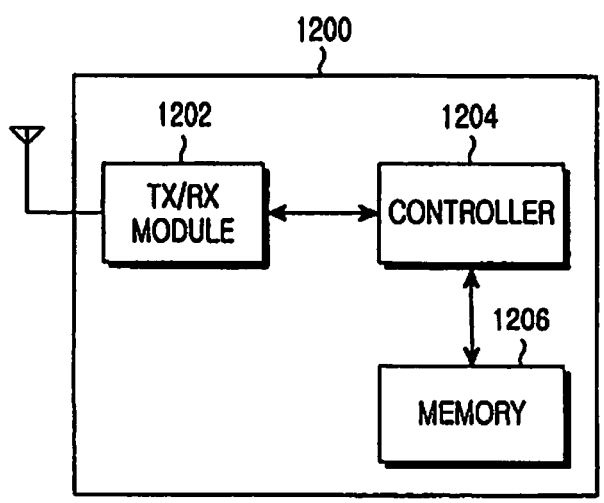
FIG. 12 is a block diagram of a UE, according to an embodiment of the present invention.

FIG. 12 is a block diagram of a UE 1200, according to an embodiment of the present invention. The UE 1200 in FIG. 12 represents the UE 309 in FIG. 3 and the UE 809 in FIG. 8.

A transmission/reception module 1202 in FIG. 12 sends/receives messages with network entities over a radio signal, and a controller 1204 receives messages through the transmission/reception module 1202, handles the received messages according to a specific procedure, and delivers messages created by a specific procedure through the transmission/reception module 1202. A memory 1206 stores parameters or data created by processing of the controller 1204. In accordance with an embodiment of the present invention, the controller 1204 determines if a CS-domain service such as a voice call service is needed, while accessing the PS domain and receiving a service through the transmission/reception module 1202. For example, upon receiving a message such as a Paging message through the transmission/reception module 1202, the controller 1204 may determine that the CS-domain service is needed. If the voice call service is needed, the controller 1204 switches to the CS domain according to a predetermined handover procedure. Further, the controller 1204 requests an MME 303 (or 803) to send a Suspend Request message through the transmission/reception module 1202 in order to request suspension of a PS-domain service.

As is apparent from the foregoing description, according to embodiments of the present invention, a UE connected to a mobile communication system not supporting a CS domain can receive a service specific to the CS domain from a heterogeneous mobile communication system that provides the CS domain.

In addition, a UE can receive a service specific to a PS domain of its mobile communication system from a heterogeneous mobile communication system that provides the PS domain.

Further, embodiments of the present invention can prevent UE's registered state in a PS domain from being released after the UE is handed over from the PS domain to the CS domain.

The present invention suspends a packet data service being provided over a PS domain to a UE that has switched from the PS domain to a CS domain to receive a voice call service, thereby preventing a waste of resources, which may occur in the PS domain.

While the invention has been shown and described with reference to certain preferred embodiments thereof, it will be understood by those skilled in the art that various changes in form and detail may be made therein without departing from the spirit and scope of the invention as defined by the appended claims and their equivalents.

What is claimed is:

1. A method, performed by an evolved node B (eNB), for providing a voice call service to a user equipment (UE) in a mobile communication system, the method comprising:
   receiving, from a mobile management entity (MME), a first message for paging to provide the voice call service to the UE; and
   sending, to the MME, a second message including a cause associated with a domain change from a packet switching (PS) domain to a circuit switching (CS) domain,
   wherein, if the MME receives the second message, a third message for requesting suspension of a bearer to provide a service for the UE is sent to a gateway in the PS domain.

2. The method of claim 1, further comprising:
   setting before the MME transmits the first message, information associated with the UE to a suspended state.

3. The method of claim 1, wherein the first message comprises a Core Network (CN) domain indicator for indicating a domain where the UE is located in order to receive the voice call service.

4. An evolved node B (eNB) for providing a voice call service to a user equipment (UE) in a mobile communication system, the eNB comprising:
   a transceiver for transmitting and receiving messages;
   a controller configured to:
     control the transceiver to receive, from a mobile management entity (MME), a first message for paging to provide the voice call service to the UE, and
     control the transceiver to transmit, to the MME, a second message including a cause associated with a domain change from a packet switching (PS) domain to a circuit switching (CS) domain, wherein, if the MME receives the second message, a third message for requesting suspension of a bearer to provide a service for the UE is sent to a gateway in the PS domain.

5. The eNB of claim 4, wherein, before the MME transmits the first message, information associated with the UE is set to a suspended state.

6. The eNB of claim 4, wherein the first message comprises a Core Network (CN) domain indicator for indicating a domain where the UE is located in order to receive the voice call service.

* * * * *